(12) United States Patent
Kunkel et al.

(10) Patent No.: US 9,214,173 B2
(45) Date of Patent: Dec. 15, 2015

(54) SLIDER WITH HIGH AND LOW SURFACE ENERGY COATINGS PROXIMATE TRANSDUCER

(71) Applicant: Seagate Technology LLC, Cupertino, CA (US)

(72) Inventors: Gary J. Kunkel, Minneapolis, MN (US); David J. Ellison, Minneapolis, MN (US); Ajaykumar Rajasekharan, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/055,143

(22) Filed: Oct. 16, 2013

(65) Prior Publication Data

US 2015/0103444 A1    Apr. 16, 2015

(51) Int. Cl.
*G11B 5/60* (2006.01)
*G11B 15/64* (2006.01)
*G11B 17/32* (2006.01)
*G11B 21/20* (2006.01)
*G11B 5/41* (2006.01)
*G11B 5/31* (2006.01)

(52) U.S. Cl.
CPC ............... *G11B 5/41* (2013.01); *G11B 5/6082* (2013.01); *G11B 5/3106* (2013.01)

(58) Field of Classification Search
CPC ...... G11B 5/6005; G11B 5/41; G11B 5/6082; G11B 5/3106
USPC ...................................................... 360/235.1
See application file for complete search history.

(56) References Cited

U.S. PATENT DOCUMENTS

| | | | |
|---|---|---|---|
| 4,327,387 A | | 4/1982 | Plotto |
| 5,986,851 A | * | 11/1999 | Angelo et al. ............. 360/235.2 |
| 6,249,403 B1 | * | 6/2001 | Tokisue et al. ............ 360/235.2 |
| 6,822,833 B2 | | 11/2004 | Yang et al. |
| 6,893,966 B2 | | 5/2005 | Delamarche et al. |
| 7,327,535 B2 | | 2/2008 | Feng et al. |
| 7,357,875 B2 | | 4/2008 | Feng et al. |
| 7,746,600 B2 | | 6/2010 | Hancer et al. |
| 7,796,356 B1 | * | 9/2010 | Fowler et al. ................... 360/75 |
| 7,855,858 B2 | | 12/2010 | Hancer et al. |
| 8,518,563 B2 | | 8/2013 | Jones et al. |
| 2001/0024728 A1 | * | 9/2001 | Kamitani et al. ............. 428/446 |
| 2004/0021987 A1 | * | 2/2004 | Yotsuya et al. ............ 360/235.8 |
| 2007/0042154 A1 | | 2/2007 | Hancer et al. |
| 2007/0196673 A1 | | 8/2007 | Hancer et al. |
| 2007/0224452 A1 | | 9/2007 | Sasa et al. |
| 2009/0073610 A1 | * | 3/2009 | Ohtani et al. ............. 360/234.3 |

OTHER PUBLICATIONS

Zhang et al., "Growth of self-assembled monolayer on tetrahedral amorphous carbon film coated magnetic head" Surface & Coatings Technology 202, pp. 3451-3456 (2008).
U.S. Appl. No. 13/938,584 (Rajasekharan et al.), filed Jul. 10, 2013.

* cited by examiner

*Primary Examiner* — Gustavo Polo
(74) *Attorney, Agent, or Firm* — HolzerIPLaw, PC

(57) ABSTRACT

A slider, such as for a data storage system, the slider having a leading edge, a trailing edge, an air-bearing surface, and a transducer proximate the trailing edge. The slider has a low surface energy coating on the air-bearing surface and a high surface energy coating on the transducer. In some embodiments, the high surface energy coating is present on a contact sensor.

13 Claims, 3 Drawing Sheets

SLIDER WITH HIGH AND LOW SURFACE ENERGY COATINGS PROXIMATE TRANSDUCER

BACKGROUND

Hard disc drives are common information storage devices having of a series of rotatable discs that are accessed by magnetic reading and writing elements. These data elements, commonly known as transducers, or merely as a transducer, are typically carried by and embedded in a slider that is held in a close relative position over discrete data tracks formed on a disc to permit a read or write operation to be carried out. Because the materials from which transducer components are made have relatively large coefficients of thermal expansion, they are particularly subject to shape changes caused by variations in temperature. During operation of the slider, the various layers of the transducing head are heated by, e.g., electrical resistance generated as a result of the operation of the magnetic read and write heads included in the transducer. Heating the transducer causes the head to expand, and thereby protrude toward the magnetic disc. Included is a sensor in the transducer area to sense when contact between the protrusion and the disc has occurred.

As distances between the slider and the disc decrease, due to the ever-growing desire to reduce the size of the disc drive and to pack more data per square inch, the potentially negative impact on any contamination on the slider increases. Unwanted contaminants on the slider can adversely affect fly height behavior, such as elevated or decreased fly height, fly asymmetry in roll or pitch character, excessive modulation, and head-disc crashing or contact by contaminant build up and accumulation on the slider and/or "bridging" mechanisms between the head and disc. All of these mechanisms result in degraded performance of the read or write operation of the head (e.g. skip-writes, modulated writers, weak writes, clearance stability and settling, and incorrect clearance setting).

What is needed is a mechanism to remove contaminants from between the slider and the disc surface, particularly in the area of the protrusion and transducer, while maintaining acceptable contact sensing between the transducer and the disc.

SUMMARY

The present disclosure provides a slider having a surface coating on at least the transducer, particularly the transducer protrusion. The coating has a first region and a second region, the first region having a higher surface energy than the second region.

One particular embodiment of this disclosure is a slider comprising a leading edge, a trailing edge, an air-bearing surface, and a transducer proximate the trailing edge. The slider has a low surface energy coating on the air-bearing surface and a high surface energy coating on the transducer.

Another particular embodiment of this disclosure is a slider having a low surface energy coating on the air-bearing surface and a high surface energy coating on the contact sensor.

Yet another particular embodiment of this disclosure is a data storage system that includes a slider having an air-bearing surface with a low surface energy coating thereon and a transducer having a high surface energy coating thereon, and a data storage media operably positioned in relation to the transducer.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

The present embodiments relate most generally to coatings on magnetic sliders for disc drives, the coatings particularly in the area of the transducer protrusion. A high surface energy coating is provided on and/or around the area of the transducer protrusion to direct the flow of fluid (e.g. disc lubricants, organic contaminants, silicones, particulates, etc.) away from the transducer. The high surface energy coating provides limited, or no, interference between the contact sensor of the transducer and the magnetic disc.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above those other elements.

Figure 1:
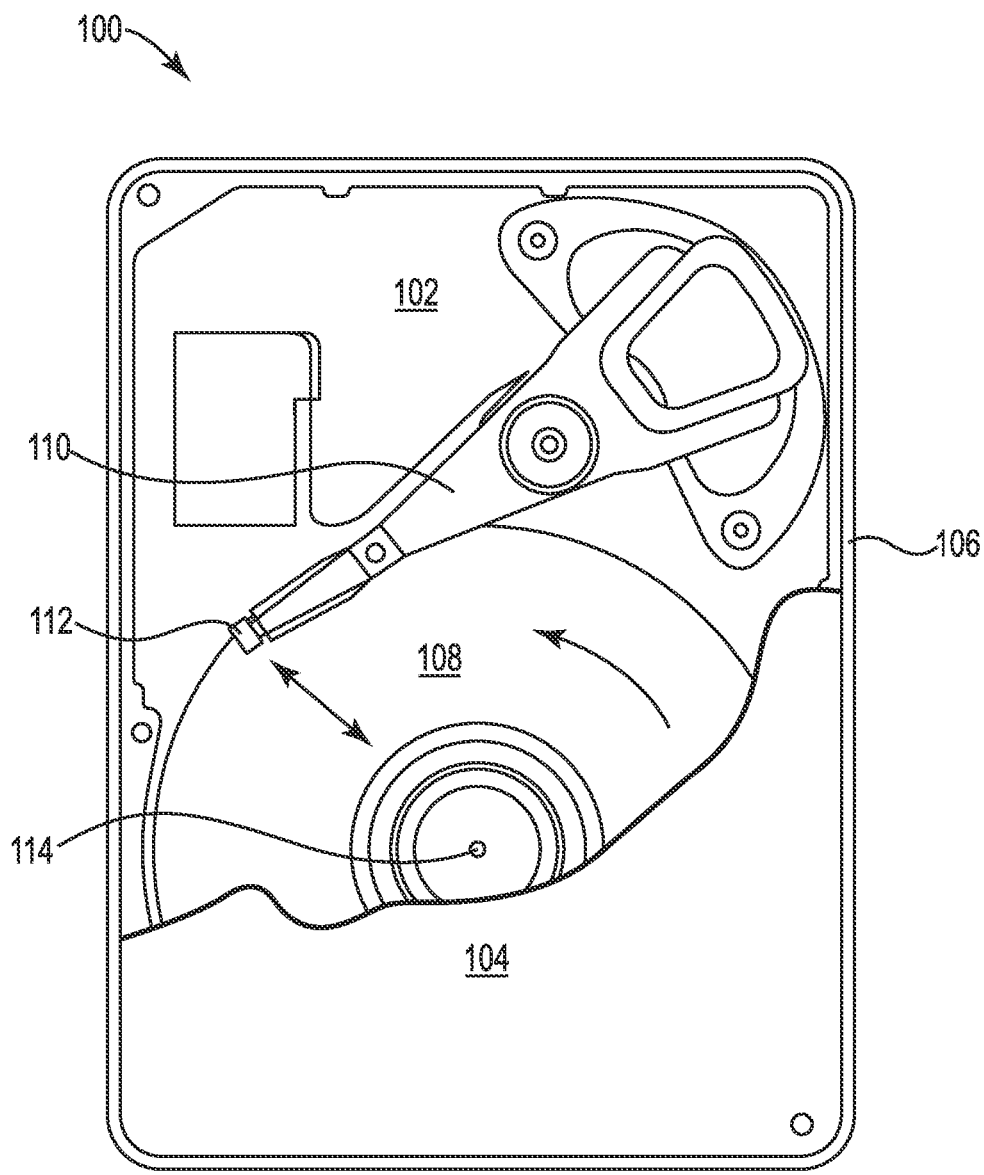
FIG. 1 is a schematic, top view of a hard disc drive.

Referring to FIG. 1, an exemplary magnetic disc drive 100 is schematically illustrated. Disc drive 100 includes base 102 and top cover 104, shown partially cut away. Base 102 combines with top cover 104 to form a housing 106, in which is located one or more rotatable magnetic data storage media or discs 108. Magnetic storage media 108 are attached to spindle 114 for co-rotation about a central axis. It should be noted that a pack of multiple discs or media 108 is utilized in some embodiments, and only a single disc or medium 108 is used in other embodiments. Each disc or medium surface has an associated slider 112 that is mounted adjacent to and in communication with its corresponding disc or media 108. Slider 112 includes a data recording transducer and a data reading transducer (also referred to as read/write heads, transducers, and the like), which read and write data to storage disc or media 108. In the example shown in FIG. 1, an actuator assembly 110, composed of various elements that are known in the field, supports slider 112. The actuator assembly 110 shown in FIG. 1 is of the type known as a rotary moving coil actuator and includes a voice coil motor to rotate actuator assembly 110 with its attached slider 112 to position slider 112 and its read/write transducers over a desired data track along an arcuate path between an inner diameter and an outer diameter of disc or media 108.

Many sliders 112 are formed from alumina titanium carbide (AlTiC), which has a high surface energy surface. In addition, the composite structure of AlTiC tends to release particles from its grains due to shock and contact events. Contaminants such as particles (e.g., AlTiC particles and other particles), moisture, and lubricant (e.g., from the disc or media 108 or from spindle 114) easily adhere or adsorb to this high surface energy surface of slider 112. Because of this, many sliders 112 include a protective overcoat over various features of slider 112, such as the read head, the write head, the air bearing surface (ABS) or rails, and/or the entire advanced air bearing (AAB) surface. The protective overcoat may be, for example, diamond-like carbon (DLC), which has a crystal lattice similar to diamond, and/or an amorphous carbon layer. In some embodiments, the protective overcoat may have a {100} crystal plane. In some embodiments, the protective overcoat is a continuous and non-interrupted layer, devoid of pinholes or other flaws in the coating. The protective overcoat has a thickness of at least 50 Angstroms, in some embodiments at least 100 Angstroms.

Figure 2:
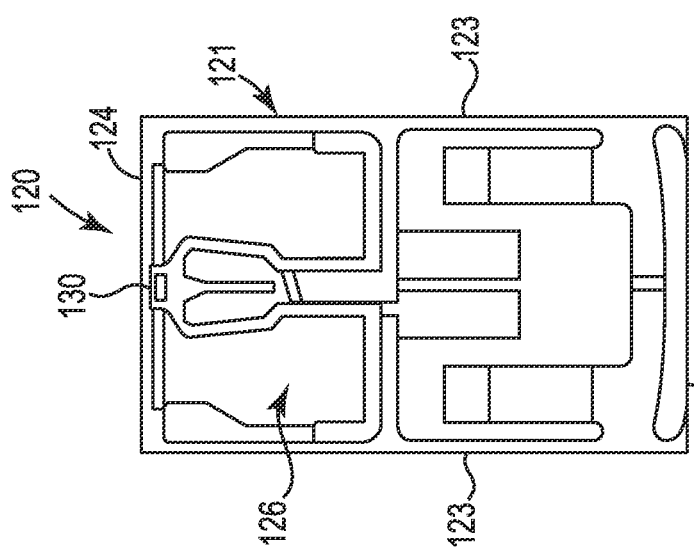
FIG. 2 is a schematic, bottom view of a slider having regions of high surface energy and low surface energy.

FIG. 2 illustrates a slider 120 enlarged to show various topographical features such as the read head, the write head, the air bearing surface (ABS) or rails, and/or the entire advanced air bearing (AAB) surface. Slider 120 has an slider body 121 defined by a leading edge 122, a trailing edge 124 and two side edges 123 connecting leading edge 122 and trailing edge 124 of body 121. Slider body 121 has an air bearing surface (ABS) 126 that is designed to control the aerodynamic performance of slider 120 as it flies over a rotating magnetic disc. In particular, air-bearing surface includes structural features such as rails, lands, ramps, depressions and the like that are designed to maximize the air-bearing surface pressure created by the stream of air flowing between ABS 126 and the disc. In some embodiments, a trench to divert and/or manage airflow is present. Slider 120 also includes a read/write head or transducer 130 that is proximate or at trailing edge 124 of slider body 121. Transducer 130 utilizes a heat-induced protrusion to sense physical contact of the read/write components of the head with magnetic storage disc 108 (shown in FIG. 1). The protrusion extends, for example, about 10 nm above the level of ABS 126, and may have an area between about 20 to 200 micrometers$^2$. One typical size for a rectangular protrusion is about 5 micrometers by 5 micrometers.

Although one particular embodiment of a slider has been illustrated in FIG. 2, it is understood that the slider may have any number of various alternate configurations of topographical features, the location transducer 130, and the shape and size of the protrusion.

Combinations of high surface energy and low surface energy surfaces are known to reduce the accumulation of lubricant and other contaminants on ABS 126. For example, U.S. patent application Ser. No. 13/938,584 (Rajasekharan et al.) filed Jul. 10, 2013 (which is incorporated herein by reference for all purposes) discloses various patterns of high surface energy and low surface energy coatings on the air-bearing surface of the slider. However, lowering the surface energy of the slider also lowers the contact detection response of the protrusion interacting with disc 108.

In accordance with this invention, present over at least a portion of the slider body surface (e.g., AlTiC) is a low surface energy coating and a high surface energy coating, with the high surface energy coating being present on, at or otherwise proximate, the transducer protrusion. In some embodiments, one or both of the coatings is a self-assembled monolayer coating, or SAM coating. The terms "self-assembled monolayer" and "SAM" as used herein refer to a thin monolayer wherein surface-active molecules present in a reaction solution are provided (e.g., adsorbed and/or chemisorbed) on the surface of the slider or the protective overcoat to produce chemical bonds therebetween.

The term "low surface energy" and variations thereof, as used herein, refers to the tendency of a surface to resist wetting (high contact angle) or adsorption by other unwanted materials or solutions; whereas, "high surface energy" refers to the tendency of a surface to increase or promote wetting (low contact angle) or adsorption by other unwanted materials or solutions. In a low surface energy material, such as a low energy SAM, the functional terminal groups of the molecules are chosen to result in weak physical forces (e.g., Van der Waals forces) between the coating and liquid and thus allow for partial wetting or no wetting of the resulting coating (i.e., a high contact angle between a liquid and the coating). Conversely in a high surface energy material, such as a high energy SAM, the functional terminal groups of molecules are chosen to result in a stronger molecular force between the coating and liquid and allow for full wetting of the of the liquid (i.e., a very small contact angle between a liquid and the coating). When both a high surface energy coating and a low surface energy coating are present, as in the patterns of this disclosure, the surface energies are relative. Values that are typically representative of "low surface energy" are in the range of 5-30 dyne/cm and high surface energy materials are relatively higher than this range, typically anything greater than 30 dyne/cm.

Figure 3:
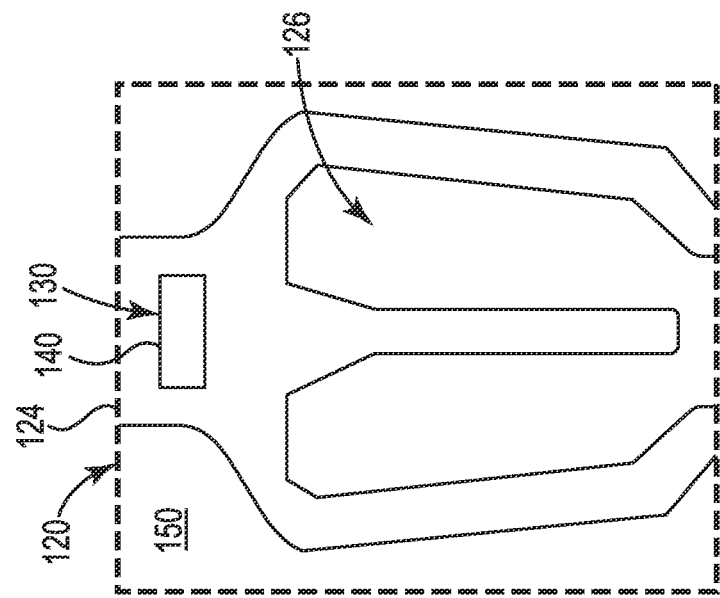
FIG. 3 is an enlarged view of a portion of the slider of FIG. 2 illustrating one embodiment of the patterns of the high surface energy and low surface energy.

The high and low surface energy coatings are present in a pattern that directs the flow of fluid (e.g., air, liquid, particulate, contaminants) in a desired direction and/or to a desired location while providing an acceptable contact detection. In the most basic pattern, present on the protrusion is a high surface energy coating and present on the remainder of the air bearing surface is a lower surface energy coating. FIG. 3 illustrates this basic pattern, with a high surface energy coating 140 present on transducer 130 proximate trailing edge 124 and a low surface energy coating 150 present on ABS 126. High surface energy coating 140 is present on at least that portion of transducer 130 that contacts the disc (e.g., disc 108) during contact detection. The presence of the high surface energy coating 140 increases the instability of the transducer-to-disc interface and thus the head modulation, thus providing a higher sensitivity of the protrusion and the contact sensor than if a lower surface energy coating or surface was present on transducer 130.

Figure 4:
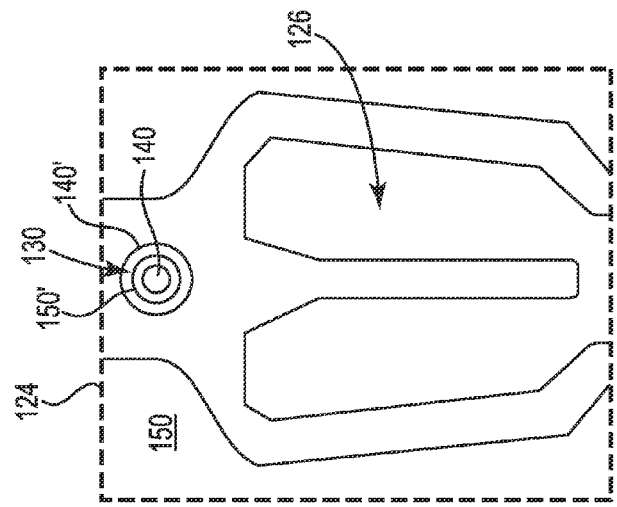
FIG. 4 is an enlarged view of a portion of the slider of FIG. 2 illustrating one embodiment of the patterns of the high surface energy and low surface energy.
Figure 5:
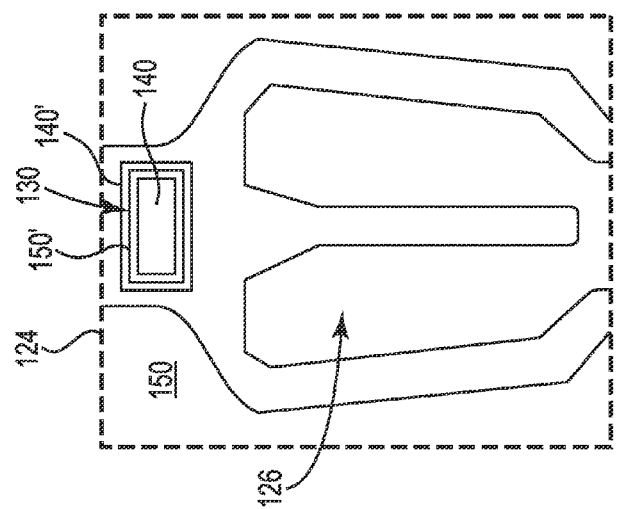
FIG. 5 is an enlarged view of a portion of the slider of FIG. 2 illustrating one embodiment of the patterns of the high surface energy and low surface energy.

FIGS. 4 and 5 illustrate alternate embodiments of a pattern of lower surface energy and high surface energy on and around transducer 130. In FIG. 4, present on the protrusion of transducer 130 are concentric rings (i.e., rectangular rings) of high surface energy coating 140' and low surface energy coating 150' around a central region of high surface energy coating 140. Low surface energy coating 150 present on the rest of ABS 126. In FIG. 5, present on the protrusion of transducer 130 is one ring (i.e., rectangular ring) of low surface energy coating 150' around a central region of high surface energy coating 140. Surrounding transducer 130 is a ring of high surface energy coating 140', around which and on the rest of ABS 126 is low surface energy coating 150.

Figure 6:
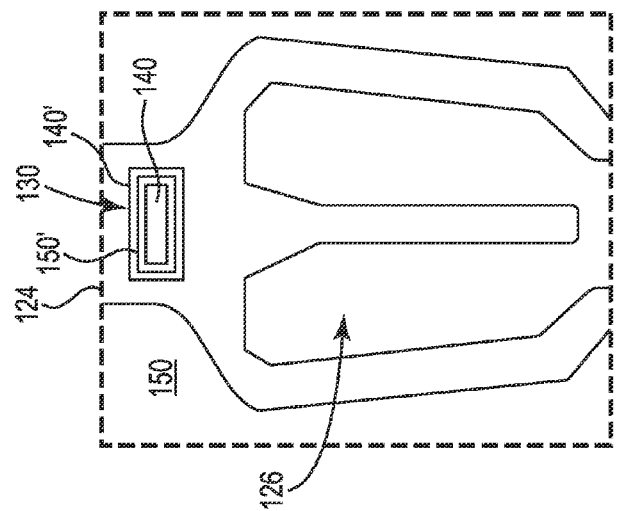
FIG. 6 is an enlarged view of a portion of the slider of FIG. 2 illustrating one embodiment of the patterns of the high surface energy and low surface energy.

FIG. 6 illustrates another embodiment, this one with transducer 130 having a circular top surface shape. Similar to the embodiment of FIG. 5, present on transducer 130 is one ring of low surface energy coating 150' around a central region of high surface energy coating 140. Surrounding transducer 130 is a ring of high surface energy coating 140', around which and on the rest of ABS 126 is low surface energy coating 150.

In all of FIGS. 4, 5 and 6, and in other embodiments, the secondary coatings 140', 150' may be the same as or different than the primary coatings 140, 150, respectively. Further in all of FIGS. 4, 5 and 6, high surface energy coating 140, 140' is illustrated immediately adjacent to or in contact with low surface energy coating 150, 150'; in alternate embodiments, a gap or region without a coating, or with a different coating, may be present between adjacent rings.

It is understood that various other arrangements of high surface energy coating 140 and low surface energy coating 150 can be utilized, as long as transducer 130 includes some high surface energy coating 140 and ABS 126 includes low surface energy coating 150. Such a pattern of high surface energy coating 140 and low surface energy coating 150 inhibits accumulation of contaminant(s) while providing acceptable contact detection response from the protrusion.

High surface energy coating 140, typically, has a surface energy greater than 30 dyne/cm. Examples of typically high surface energy materials include diamond-like carbon, fluorinated carbon materials, and high energy self-assembled monolayer or SAM materials, such as 3-aminopropyltrimethoxysilane and dodecyltrichlorosilane (DTS).

Low surface energy coating 150 may be any material that provides a surface energy less than the surface energy of high surface energy coating 140. Typically however, low surface energy coating 150 has a surface energy in the range of 5-30 dyne/cm. Examples of typical lower surface energy materials include low energy self-assembled monolayer or SAM materials, such as perfluorodecyltricholorsiliane (FDTS) and other fluorinated organosilane derivatives.

Self-assembled monolayer materials, or SAM materials, are preferred for some embodiments, for either or both high surface energy coating 140 and low surface energy coating 150 because SAM materials are widely available in a range of surface energies and can be readily applied in the desired patterns.

The precursor compound for forming the self-assembled monolayer or SAM contains molecules having a head group and a tail with a functional end group. Common head groups include thiols, silanes with hydrolizable reactive groups (e.g., halides: {F, Cl, Br, I}, and alkoxys: {methoxy, ethoxy, propoxy}, phosphonates, etc. Common tail groups include alkyls with 1-18 carbon atoms in addition to other unsaturated hydrocarbon variants, such as, aryl, aralkyl, alkenyl, and alkenyl-aryl. In addition the hydrocarbons materials listed above can be functionalized with fluorine substitutions, amine terminations, as well as carbon oxygen functional groups such as ketones and alcohols, etc. SAMs are created by chemisorption of the head groups onto the substrate material (i.e., in this application, onto the slider body and protective overcoat) from either a vapor or liquid phase, by processes such as immersion or dip coating, spraying, chemical vapor deposition (CVD), micro-contact printing, dip-pen nanolithography, etc. The head groups closely assemble on the material with the tail groups extending away from the material. The self-assembled monolayer can be, for example, an organosilane (e.g. alkyl trichlorosilane, fluorinated alkyl trichlorosilane, alkyl trialkyloxysilane, fluorinated alkyl trialkyloxysilane, etc.).

The precursor compound of the SAM may be present in any conventionally-used organic solvent, water, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-haxanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (TEXANOL)); dichloroethene (DCE); chlorobenzene; and N-methyl-2-pyrrolidone (NMP).

The concentration of the precursor compound in the solution may be determined by those skilled in the art according to the intended applications and purposes and may be in the range of about 5 to about 20 mM. An immersion step may be performed without particular limitation and may be carried out at room temperature for about 20 to 120 minutes. Similarly, other methods may be carried out by conventional means.

An example of a commercially available low surface energy SAM is 1H,1H,2H,2H-perfluorodecyltrichlorosilane (alternately, heptadecafluoro-1,1,2,2-tetrahydro-decyl-1-trichlorosilane) [CAS: 78560-44-8], of course, other low surface energy SAM materials could be used. In general the class of fluorinated organosilane derivatives would work as low energy SAM materials. Other examples of commercially available low surface energy SAMs include: trifluoropropyltrimethoxysilane, heneicosafluorododecyltrichlorosilane, nonafluorohexyltrimethoxysilane, methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane.

An example of a commercially available high surface energy SAM is (3-aminopropyl)-trimethoxysilane [CAS: 13822-56-5]. Of course, other high surface energy SAM materials could be used. The general class of organosilanes with amine, alcohol, or mercapto substituents would provide for a high surface energy SAM, relative to the above. Some commercially available examples include: (3-Mercaptopropyl)trimethoxysilane, methyl 11-[dichloro(methyl)silyl]undecanoate, acetoxyethyltrichlorosilane, and vinyltriethoxysilane.

As described above and illustrated in the figures, the present invention is directed to managing the accumulation of contaminants, including lubricant and other organic contaminants, on the slider air-bearing surface particularly at and proximate the protrusion of the transducer by providing a high surface energy coating on the transducer protrusion and a low surface energy coating on the air-bearing surface of the slider. The pattern of the high surface energy coating and the low surface energy coating provides smooth channeling of contaminant(s) (e.g., lubricant droplets) away from the transducer. Further, the high surface energy coating on the transducer (e.g., on the protrusion) improves the function of the contact sensor in the transducer over embodiments where no high surface energy coating is present.

Thus, embodiments of the SLIDER WITH HIGH AND LOW SURFACE ENERGY COATINGS PROXIMATE TRANSDUCER are disclosed. The self-assembled monolayer pattern (SAM) is configured to direct the flow of fluid across the working surface of the slider in an efficient manner. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A slider comprising a leading edge, a trailing edge, an air-bearing surface, and a transducer proximate the trailing edge, the slider comprising:
    a low surface energy self-assembled monolayer coating on the air-bearing surface; and
    a high surface energy self-assembled monolayer coating and a second low surface energy coating present as concentric rings on the transducer.

2. The slider of claim 1 wherein the low surface energy self-assembled monolayer coating comprises a fluorinatedorganosilane.

3. The slider of claim 1 wherein the low surface energy self-assembled monolayer coating comprises perfluorodecyltrichlorosilane.

4. The slider of claim 1 wherein the high surface energy self-assembled monolayer coating comprises dodecyltrichlorosilane.

5. The slider of claim 1 wherein present on the transducer, in concentric rings, are the high surface energy self-assembled monolayer coating, the secondary low surface energy coating, and a secondary high surface energy coating.

6. A slider comprising a leading edge, a trailing edge, an air-bearing surface, and a transducer proximate the trailing edge, the transducer including a contact sensor, the slider comprising:
    a low surface energy self-assembled monolayer coating on the air-bearing surface; and
    a high surface energy self-assembled monolayer coating and a secondary low surface energy coating present on the contact sensor in concentric rings.

7. The slider of claim 6 wherein the low surface energy self-assembled monolayer coating comprises perfluorodecyltrichlorosilane.

8. The slider of claim 6 wherein the high surface energy coating comprises dodecyltrichlorosilane.

9. A data storage system comprising:
    a slider having an air-bearing surface with a low surface energy self-assembled monolayer coating thereon and a transducer having a high surface energy self-assembled monolayer coating and a secondary low surface energy coating present thereon in concentric rings; and
    a data storage media operably positioned in relation to the transducer.

10. The system of claim 9 wherein the data storage media comprises at least one magnetic disc.

11. The system of claim 9 wherein present on the transducer, in concentric rings, are the high surface energy self-assembled monolayer coating, the secondary low surface energy coating, and a secondary high surface energy coating.

12. The slider of claim 1, wherein present on the transducer, in concentric rings, are the high surface energy self-assembled monolayer coating and a secondary low surface energy self-assembled monolayer coating.

13. The slider of claim 12 wherein present on the transducer, in concentric rings, are the high surface energy self-assembled monolayer coating, the secondary low surface energy self-assembled monolayer coating, and a secondary high surface energy self-assembled monolayer coating.

* * * * *